(12) United States Patent
Clungeon et al.

(10) Patent No.: US 7,404,875 B2
(45) Date of Patent: Jul. 29, 2008

(54) MODIFIED CREPING ADHESIVE COMPOSITION AND METHOD OF USE THEREOF

(75) Inventors: Nancy Clungeon, Manawa, WI (US); Jeffrey J. Boettcher, Appleton, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 58 days.

(21) Appl. No.: 10/833,473

(22) Filed: Apr. 28, 2004

(65) Prior Publication Data

US 2005/0245669 A1 Nov. 3, 2005

(51) Int. Cl.
- *D21H 27/40* (2006.01)
- *D21H 17/04* (2006.01)
- *D21H 21/22* (2006.01)
- *D21H 17/20* (2006.01)
- *B31F 1/12* (2006.01)

(52) U.S. Cl. .............. 162/111; 162/109; 162/158; 162/164.1; 162/168.1; 162/173; 162/175; 162/178; 162/180; 162/181.1; 162/281; 34/110; 34/454; 34/481; 106/226

(58) Field of Classification Search ......... 162/109–117, 162/158, 164.1, 168.1, 175, 178, 280, 281, 162/180, 181.1, 164.6, 166, 168.2, 168.3, 162/169, 173, 181.5; 34/110, 454, 481; 106/226, 106/205.5, 180.1, 170.25, 149.1, 130.1, 144.5, 106/147.4, 148.3, 169.25; 264/134, 136, 264/282, 283
See application file for complete search history.

(56) References Cited

U.S. PATENT DOCUMENTS

| | | | |
|---|---|---|---|
| 3,058,873 A | 10/1962 | Keim et al. | |
| 3,301,746 A | 1/1967 | Sanford et al. | |
| 3,640,841 A | 2/1972 | Winslow et al. | |
| 3,905,863 A | 9/1975 | Ayers | |
| 3,926,716 A | 12/1975 | Bates | |
| 3,976,606 A | 8/1976 | Gobran | |
| 4,051,640 A | 10/1977 | Vincens | |
| 4,064,213 A | 12/1977 | Lazorisak et al. | |
| 4,075,177 A | 2/1978 | Bonnet et al. | |
| 4,109,053 A * | 8/1978 | Aldrich | 428/413 |
| 4,304,625 A | 12/1981 | Grube et al. | |
| 4,496,397 A | 1/1985 | Waite | |
| 4,528,316 A | 7/1985 | Sorens | |
| 4,584,439 A | 4/1986 | Paddock | |
| 4,585,585 A | 4/1986 | Waite | |
| 4,654,389 A * | 3/1987 | Graham et al. | 524/272 |
| 4,687,740 A | 8/1987 | Waite | |
| 4,701,517 A | 10/1987 | Daughenbaugh, Jr. | |
| 4,788,243 A | 11/1988 | Sorens | |
| 4,808,702 A | 2/1989 | Waite | |
| 4,883,564 A * | 11/1989 | Chen et al. | 162/112 |
| 4,886,579 A * | 12/1989 | Clark et al. | 162/111 |

(Continued)

FOREIGN PATENT DOCUMENTS

WO    WO9946251    9/1991

(Continued)

*Primary Examiner*—Eric Hug

(57) ABSTRACT

A modified creping adhesive composition, comprising an adhesive component and at least one terpene modifier, and its use in the production of creped paper products by a process which includes the steps of adhering a paper web to the surface of a drying cylinder and separating the paper web from the drying cylinder with a creping blade.

23 Claims, 1 Drawing Sheet

Creping Process

U.S. PATENT DOCUMENTS

| | | | |
|---|---|---|---|
| 4,950,361 A | 8/1990 | Bender et al. | |
| 5,048,589 A | 9/1991 | Cook et al. | |
| 5,179,150 A | 1/1993 | Furman, Jr. | |
| 5,246,544 A | 9/1993 | Hollenberg et al. | |
| 5,326,434 A * | 7/1994 | Carevic et al. | 162/111 |
| 5,348,620 A | 9/1994 | Hermans et al. | |
| 5,370,773 A | 12/1994 | Luu et al. | |
| 5,388,807 A | 2/1995 | Habicht | |
| 5,501,768 A | 3/1996 | Hermans et al. | |
| 5,574,134 A | 11/1996 | Waite | |
| 5,863,385 A | 1/1999 | Siebott et al. | |
| 5,916,857 A | 6/1999 | Watson et al. | |
| 5,936,024 A | 8/1999 | Ling et al. | |
| 5,961,782 A * | 10/1999 | Luu et al. | 162/111 |
| 5,985,095 A | 11/1999 | Scholz | |
| 6,051,106 A | 4/2000 | Omura et al. | |
| 6,133,405 A | 10/2000 | Allen | |
| 6,150,452 A | 11/2000 | Ling et al. | |
| 6,165,322 A | 12/2000 | Bower et al. | |
| 6,207,734 B1 * | 3/2001 | Vinson et al. | 524/47 |
| 6,214,932 B1 | 4/2001 | Maslanka | |
| 6,222,006 B1 | 4/2001 | Kokko et al. | |
| 6,277,242 B1 * | 8/2001 | Archer et al. | 162/111 |
| 6,280,571 B1 | 8/2001 | Allen | |
| 6,331,230 B1 | 12/2001 | Hermans et al. | |
| 6,336,995 B1 | 1/2002 | Campbell | |
| 6,432,267 B1 | 8/2002 | Watson | |
| 6,440,267 B1 | 8/2002 | Rekoske et al. | |
| 6,454,901 B1 | 9/2002 | Sekiya et al. | |
| 6,497,789 B1 | 12/2002 | Hermans et al. | |
| 6,540,879 B2 | 4/2003 | Marinack et al. | |
| 6,541,099 B1 | 4/2003 | Merker et al. | |
| 6,547,924 B2 | 4/2003 | Drew et al. | |
| 6,547,925 B1 | 4/2003 | Drew et al. | |
| 6,991,706 B2 * | 1/2006 | Lindsay et al. | 162/109 |
| 2003/0116259 A1 * | 6/2003 | Sayovitz et al. | 156/183 |
| 2005/0098287 A1 * | 5/2005 | Mah | 162/173 |

FOREIGN PATENT DOCUMENTS

WO  WO0039396  7/2000

* cited by examiner

Creping Process

MODIFIED CREPING ADHESIVE COMPOSITION AND METHOD OF USE THEREOF

BACKGROUND OF THE INVENTION

The present invention relates generally to the manufacture of crepe paper products, and more particularly to a modified creping adhesive composition which facilitates the creping of paper webs for making disposable and/or absorbent tissue, towels, napkins, or other paper products.

Paper is generally manufactured by suspending cellulosic fiber of appropriate geometric dimensions in an aqueous medium, forming the fiber into a wet ribbon or web on a porous support and then drying the web. In the manufacture of disposable and/or absorbent tissue, towel and the like, creping is performed in order to impart desired aesthetic and performance properties to the resulting product. Creping is generally carried out by causing the cellulosic fiber web to adhere to the surface of a large, rotating cylindrical dryer, known in the industry as a Yankee dryer, and then scraping the web off of the dryer surface by means of a doctor blade. This blade is also sometimes referred to as a creping blade. The result is an increase in basis weight (mass per unit area) as well as dramatic changes in many physical properties of the web, particularly when measured in the machine direction.

Traditionally, absorbent paper has been produced by one of three basic technologies: (i) conventional wet press technology with wet creping and embossing, as described in U.S. Pat. No. 5,048,589 to Cook et al.; (ii) conventional wet press technology with dry creping and embossing, as described in U.S. Pat. No. 5,048,589 to Cook et al.; and (iii) through-air-drying (TAD), with or without creping. Conventional TAD processes are generally described in U.S. Pat. No. 3,301,746 to Sanford et al. and U.S. Pat. No. 3,905,863 to Ayers.

Typically, the paper web is first formed on a foraminous carrier or support, such as a Fourdrinier wire, where it is freed of the copious water needed to disperse the fibrous slurry. Thereafter, it is usually transferred to a felt or fabric in a so-called press section where de-watering is continued either by mechanically compacting the paper or by some other de-watering method such as through-drying with hot air, before finally being transferred in the semi-dry condition to the surface of the Yankee dryer for the drying to be completed.

The impact of the adhered web with the doctor blade is essential in order to obtain from the drying process a dried paper web having the properties desired by the manufacturer. This creping action has the effect of breaking a substantial number of interfiber bonds in the paper web, increasing its bulk, and resulting in improved softness and absorbency. The term "bulk," as used herein, refers to the inverse of the density of a tissue paper web.

The paper web is caused to adhere to the Yankee dryer well around the cylindrical heating surface from the doctor blade, which crepes the traveling web as it is separated from the dryer. To adhere the nascent web to the surface of the Yankee dryer, a creping adhesive alone or in combination with a release agent, ordinarily in the form of an aqueous solution, emulsion or dispersion, is applied to the rotating surface prior to its taking up the partially dried web, which occurs with the assistance of a pressure roll. Alternatively, the spray may be applied to the traveling web. Suitable apparatus for use with the present invention is disclosed in U.S. Pat. No. 4,304,625 to Grube et al. and U.S. Pat. No. 4,064,213 to Lazorisak et al.

The level of adhesion of the papermaking web to the dryer is of considerable importance in relation to control of the web in its travel in the space between the creping blade and the reel, and to crepe formation itself. Different creped products require different levels of adhesion, tack and rewetability. For example, a facial tissue web will require a different level of adhesion and tack and rewetability in comparison to a paper towel web. Webs which are not sufficiently adhered to the dryer tend be difficult to control, with consequent difficulties in forming a uniform reel of paper. A loose sheet leads to poor creping, wrinkles in the reel, Holdovers, or weaving of the sheet in the rolled-up paper, which can lead to problems in converting. Hence it is very important to be able to control the level of adhesion and tack of the adhesive package (i.e., adhesive plus additives) by appropriate modification of its properties.

The level of adhesion of the papermaking web to the drying surface is also of importance in relation to the drying of the web. Higher levels of adhesion tend to promote heat transfer and cause the web to dry faster, enabling more energy efficient, higher speed operation. Low levels of adhesion can inhibit heat transfer, resulting in poor drying of the web.

Rewetability is another important characteristic of a creping adhesive. "Rewetability," as used herein, refers to the ability of the adhesive material to be activated by the moisture contained in the semi-dry web when the web is brought into contact with the adhesive material on the heated drying surface. A marked increase in tack is indicative of high rewetability.

Various types of creping adhesives are known. Some unmodified adhesives, such as polyamidoamine-epichlorohydrin (PAAE) and polyvinyl alcohol (PVOH) tend to form a very hard coating with poor tack and rewetability properties. It is also known to incorporate one or more modifier into a-creping adhesive to impart certain desirable properties to the adhesive. See, for example, U.S. Pat. No. 6,280,571 to Allen.

The development of a creping adhesive providing enhanced performance with respect to level of adhesion, tack and rewetability remains a highly desired objective in the paper industry.

BRIEF SUMMARY OF THE INVENTION

In accordance with one aspect of the present invention, there is provided a modified creping adhesive composition which is in liquid form and which comprises an adhesive component and at least one terpene-containing modifier component.

The present invention also provides an improved method of making crepe paper products. The method of the invention entails causing a web of paper-making fibers to adhere against the surface of a rotating cylindrical dryer and separating the web from the surface by a creping blade, in the usual manner, with the improvement involving application of the modified creping adhesive composition described herein to the surface of the rotating cylindrical dryer, or to the wet web itself.

The addition of terpene modifiers, as described hereinbelow, to adhesive packages has the advantage of helping to soften and/or plasticize the creping adhesive. Additional improvements have been achieved when using terpene modifiers in PVOH-type adhesives together with inorganic modifiers, such as ammonium zirconium carbonate (AZC) or potassium zirconium carbonate (KZC), as described in detail hereinbelow.

BRIEF DESCRIPTION OF THE DRAWING

The sole drawing figure is a schematic illustration of a process for the production of crepe paper products which utilizes the modified creping adhesive composition of the present invention.

DETAILED DESCRIPTION OF THE INVENTION

Figure 1:
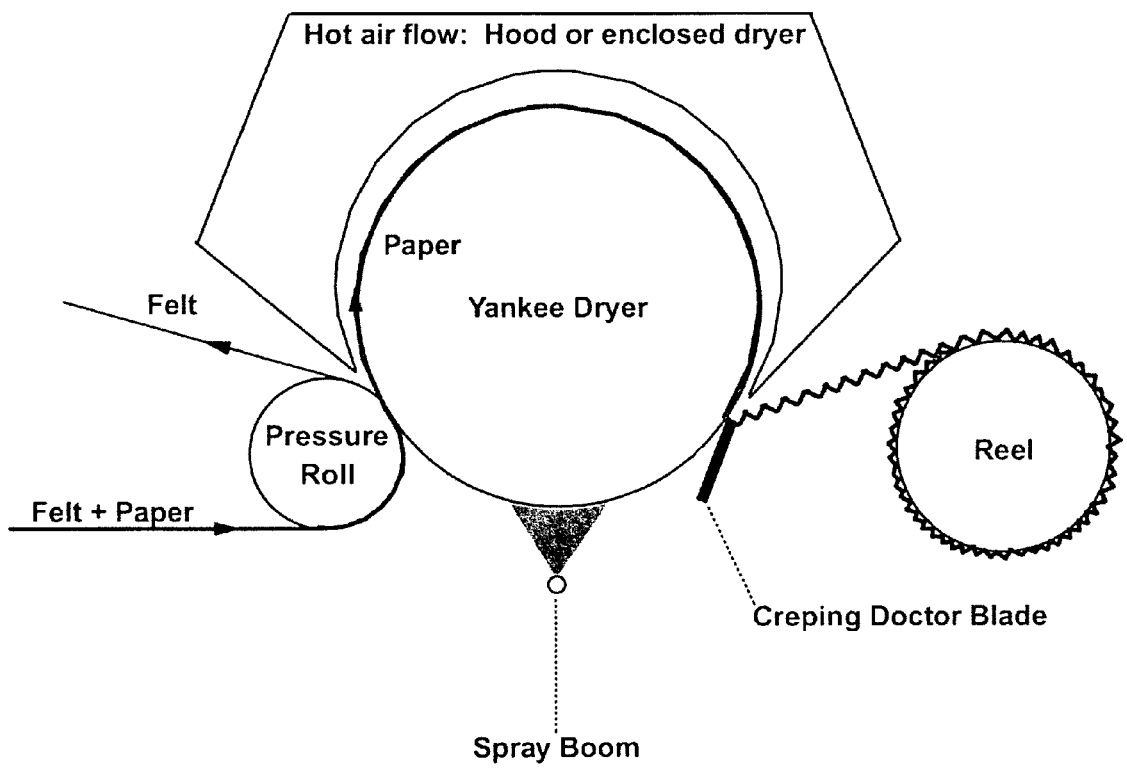

The disposable and/or absorbent tissues, towels, napkins and the like described herein are all paper products in sheet form made by a creping process which, in its basic operation, involves the steps of forming an aqueous paper-making furnish, depositing the furnish on a foraminous surface, such as a Fourdrinier wire, and removing the water from the furnish as by gravity or vacuum-assisted drainage, with or without pressing, and by evaporation, followed by adhering the sheet in a semi-dry condition to the surface of a Yankee dryer, completing the water removal by evaporation to an essentially dry state, separating the web from the cylindrical surface of the Yankee dryer by means of a creping blade and winding the resultant sheet onto a reel.

The step of adhering the semi-dry sheet to the surface of the rotating, cylindrical dryer is carried out with the aid of the adhesive composition of the present invention, which includes a creping adhesive and a terpene modifier to improve wet tack, dry tack, and rewetability.

The terpene employed as a modifier component in the creping adhesive composition of this invention may be a terpene in substantially pure form (at least about 70% pure, the balance including octanol, nonaol, decanol and linalool, and preferably about 95% pure), a terpene mixture, such as citrus peel oil, terpene derivatives, e.g., ethers, or a terpene resin, including a hydrocarbon terpene resin, an aromatic terpene resin, a hydrogenated terpene resin or mixtures of such resins. Terpene resins of the type mentioned above are typically produced by the cationic polymerization of a terpene monomer, e.g., limonene, careen or the like.

Terpenes and terpene derivatives which are suitable for use in practicing this invention include the following (with their corresponding CAS Registry Numbers given in square brackets): tricyclene [508-32-7], α-pinene [80-56-8], α-fenchene [471-84-1], camphene [79-92-5], β-pinene [127-91-3], myrcene [123-35-3], ocimene [13877-91-3], cis-pinane [6876-13-7], cis/trans-p-8-menthene [6252-33-1], trans-2-p-menthene [1124-26-1]. p-3-menthene [500-00-5], trans-p-menthane [1678-82-6], 3-carene [13466-78-9], caryophyllene [87-44-5], cis-p-menthane [6069-98-3], 1,4-cineole [470-67-7], 1,8-cineole [470-82-6], α-terpinene [99-86-5], ρ-1-menthene [499-94-5], p-4(8)-methene [34105-55-0], limonene [5989-27-5], p-cymene [25155-15-1], γ-terpinene [99-85-4]p-3,8-menthadiene [586-67-4], p-2,4(8)-menthadiene [138-86-3], terpinolene [586-62-9], isobornyl methyl ether [5331-32-8], α-terpinyl methyl ether [14576-08-0]. Preferred among these monoterpenes are: limonene, myrcene, ocimene, α-terpinene, terpinolene, p-cymene, 1,8-cineole, camphene and carophyllene. The various isomers of the aforementioned terpenes may also be used as creping adhesive modifiers in accordance with this invention. Most preferred is d-limonene, a derivative of citrus oils. A discussion regarding d-limonene and its derivation from numerous sources is set forth in Kesterson, J. W., "Florida Citrus Oil," Institute of Food and Agricultural Sciences, University of Florida, December 1971. D-limonene is commercially available from Florida Chemical Company, Inc.

Various water soluble polymer materials may be used as the adhesive component in the modified creping adhesive composition of this invention. These include, without limitation, polyamidoamine-epichlorohydrin resins, polyamide-epichlorohydrin resins, poly (diallyamine)-epichlorohydrin resins, polyalkylene polyamine-epichlorohydrin resins, the reaction product of an epihalohydrin and an end-capped polyaminamide polymer, polyalkanolamides, the reaction product of (a) a mixture of polyamide and at least one of polyvinyl alcohol and low molecular weight polyethyleneimine and (b) epihalohydrin, poly(vinyl alcohol), poly(vinyl alcohol)copolymers, polyacrylamide, polymethacrylamide which may be partially hydrolyzed, poly(acrylic acid), poly (methacrylic acid), poly(hydroxyethyl acrylate), poly(hydroxyethyl methacrylate), poly(N-vinyl pyrrolidinone), polyvinylamine, polyethylene-imine, poly(ethylene oxide), poly(ethylene glycol), ethylene-vinyl acetate copolymer, hydroxyethyl cellulose, hydroxpropyl cellulose, guar gum, starch, agar, alginic acid, chitosan, carboxymethyl cellulose, highly branched polyamidoamines, and silyl-linked polymers.

The above-mentioned polyamidoamine-epichlorohydrin resins may, if desired, bear polyol side chains, as described in U.S. Pat. No., 6,165,322 to Bower.

The above-mentioned polyamide-epichlorohydrin resins may be hydrophobically modified. Such modification can be achieved by reacting a polyamide-epichlorohydrin resin with an anionic polyelectrolyte, such as that made by reacting a polymeric compound having anhydride groups with a secondary amine having at least one fatty aliphatic group.

Adhesive materials of the type described above, which may be incorporated into the composition of this invention both singly and in combination, have been described in various patents including, without limitation: U.S. Pat. Nos. 3,058,873, 3,640,841, 3,926,716, 4,075,177, 4,304,625, 4,501,640, 4,528,316, 4,584,439, 4,788,243, 5,179,150, 5,388,807, 6,133,405, 6,214,932, 6,214,932, 6,222,006 and 6,277,242.

A preferred group of adhesive materials includes cationic polymers having azetidinium, epoxide or hydroxyl functionalities, for example, polyamide-epichlorohydrin resin, poly (diallylamine)-epichlorohydrin resin, polyalkylene polyamine-epichlorohydrin resin, polyamidoamine-epichlorohydrin resin, polyvinyl alcohol or silyl-linked polymers such as silyl-linked polyamidoamines, as well as polyacrylamide, poly(ethylene oxide), poly(ethylene glycol), hydroxyethylcellulose, hydroxypropylcellulose, carboxymethylcellulose and guar gum.

Another preferred group of adhesive materials includes non-self-crosslinkable polymers or oligomers which have functional groups that form hydrolyzable ionic cross-links with a suitable cross-linking agent. Cross-linking agents that can be used for this purpose are transition metal salts that provide ionic crosslinks between functional groups of the non-self-crosslinking polymer or oligomer. Zirconium salts have been found to be particularly useful cross-linking agents, with ammonium zirconium carbonate and potassium zirconium carbonate being preferred.

The term "non-self-crosslinkable polymer or oligomer," as used herein, refers to creping adhesive materials which have, or are modified to include, a crosslinked functional group such as a hydroxyl group, a carboxyl group, a sulfide group, a phosphate group, or a combination thereof. Representative examples of non-self-crosslinkable polymers or oligomers, which can be used in the composition of this invention, include polyvinyl alcohol, poly(acrylic acid), poly(methacrylic acid), partially hydrolyzed polyacrylamide, partially hydrolyzed polymethacrylamide, carboxymethylcellulose, alginic acid and polysaccharides such as starch, cellulose and cellulose derivatives, agar and guar gum. Further details regarding the preparation of creping adhesives comprising non-self-crosslinkable polymers or oligomers and transition metal-crosslinking agents are provided in U.S. Pat. No. 5,370,773 to Luu et al.

A particularly preferred group of adhesive materials for use in the modified creping adhesive composition described herein includes at least one synthetic, natural or synthetically modified natural water soluble polymer, oligomer or copolymer selected from the group consisting of polyamidoamine-epichlorohydrin resins, polyamide-epichlorohydrin resins, poly(vinyl alcohol), highly branched polyamidoamines, and silyl-linked polyamidoamines.

Polyamide-epichlorohydrin resins suitable for use as an adhesive component of the above-described composition are commercially available as Unisoft 805 (Hercules Corp., Wilmington, Del.) and Crepecel 690HA® (Ondeo-Nalco, Naperville, Ill.). Polyvinyl alcohol resins suitable for use as a creping adhesive in accordance with this invention are available as Celvol 523®, Celvol 540® and Celvol 205® (Celanese Corp., Dallas, Tex.), various grades of Elvanol® polymers and copolymers (Du Pont, Wilmington, Del.), various grades of Mowiol® (Clariant GmbH, Sulzbach, Germany) and CR-170 (Chemtreat, Inc. (Glen Allen, Va.).

The properties of the modified creping adhesive of the present invention can be varied, as desired, by means of certain additives. For example, release agents, tackifiers, surfactants, dispersants, salts which are effective to adjust water hardness, acids or bases for adjusting the pH of the composition or other useful additives may be incorporated into the composition, in accordance with common practice in the industry. For example, the creping composition may include polyols, such as glycerol, propylene glycol, ethylene glycol, polyethylene glycol, alkylpolyglucoside (APG) and the like, which may serve multiple purposes as surfactants and/or co-solvents and/or viscosity modifiers.

Phosphate salts may be added to the composition to reduce the hard film build-up on the creping surface of the Yankee dryer. The addition of phosphate salts also has the effect of promoting the anti-corrosion property of the adhesive composition. If a phosphate salt additive is used, the amount will normally be in the range of about 5 to about 15 weight percent, based on the total weight of the adhesive composition.

Modified creping adhesive compositions according to the present invention typically comprise about 1 to about 10 weight percent of the terpene modifier, preferably 1 to 5 weight percent, based on the total solids content of the composition. Additives, when used, will normally make up from about 0.5 up to about 5 weight percent, based on the total solids content of the composition.

Referring to the drawing figure, there is illustrated a conventional crepe wet-forming process for the production of tissue paper. This process includes the steps of forming a fibrous web, applying a creping adhesive to the surface of a Yankee dryer causing the fibrous web to adhere to the surface of the dryer by means of a creping adhesive applied to the dryer surface, removing the fibrous web from the dryer by use of a doctor blade and winding the dry fiber onto a roll. Alternatively, the creping adhesive can be applied to the surface of the fibrous web that will contact the dryer, before the fibrous web is brought into contact with the dryer surface.

As shown in the drawing figure, the carrier fabric 5 carries the formed, semi-dry web 10 to the nip between the rotating, cylindrical Yankee dryer 30 and pressure roll 32. The pressure roll and dryer move as indicated by the arrows. The heated drying cylinder is partially enclosed by drying hood 34. The pressing of the web 10 to the cylindrical dryer 30 is well around the roll from creping blade 28, which as schematically indicated, crepes the traveling web from the dryer as shown at 36. The dried creped web 36 exiting from the dryer is wound onto take-up reel 38 to form a soft creped tissue roll 40.

In order to adhere the nascent web 10 to the surface of the cylindrical dryer, a spray 42 of the adhesive composition of the invention is applied to the drying surface ahead of the nip between the pressure roll 32 and Yankee dryer 30. Alternatively, the spray may be applied directly onto the traveling web 10, as shown at 42a.

The creping operation described above does not incorporate all the possible configurations used for causing a nascent web to adhere to a Yankee dryer. It is used merely to describe how the adhesive of the present invention can be applied to promote adhesion and thereby influence the crepe of the resulting product. Thus, the method of application of the adhesive to the dryer surface or the web itself is not restricted to spray applications, although spraying is generally the simplest method for adhesive application.

The amount of modified creping adhesive applied in the manner described above ranges from about 0.1 pounds per ton to about 10 pounds per ton, which is based on the dry weight of the creping adhesive (measured in pounds) relative to the dry weight of the paper web (measured in tons). Preferably, the amount of adhesive composition applied is in the range of about 0.5 pounds per ton to about 2 pounds per ton.

Many fiber types may be used for the present invention including hardwood or softwoods, straw, flax, abaca, hemp, kenaf, bagasse, cotton, reed, and the like. All known papermaking fibers may be used, including bleached and unbleached fibers, fibers of natural origin (including wood fiber and other cellulosic fibers, cellulose derivatives, and chemically stiffened or crosslinked fibers) or synthetic fibers (synthetic papermaking fibers include certain forms of fibers made from polypropylene, acrylic, aramids, acetates, and the like), virgin and recovered or recycled fibers and fibers that have been mechanically pulped (i.e., groundwood), chemically pulped (including but not limited to the kraft and sulfite pulping processes), thermomechanically pulped, chemithermo-mechanically pulped, and the like. The mixtures of any subset of the above mentioned or related fiber classes may be used. The fibers can be prepared in a multiplicity of ways known to be advantageous in the art. Useful methods of preparing fibers include dispersion to impart curl and improved drying properties, such as disclosed in U.S. Pat. Nos. 5,348,620 and 5,501,768, both to M. A. Hermans et al.

Chemical additives may also be used and may be added to the original fibers, to the fibrous slurry or added on the web during or after production. Such additives include opacifiers, pigments, wet strength agents, dry strength agents, softeners, emollients, humectants, viricides, bactericides, buffers, waxes, fluoropolymers, odor control materials and deodorants, zeolites, dyes, fluorescent dyes or whiteners, perfumes, debonders, vegetable and mineral oils, humectants, sizing agents, superabsorbents, surfactants, moisturizers, UV blockers, antibiotic agents, lotions, fungicides, preservatives, aloe-vera extract, vitamin E, or the like. The application of chemical additives need not be uniform, but may vary in location and from side to side in the tissue. Hydrophobic material deposited on a portion of the surface of the web may be used to enhance properties of the web.

The present invention may be used to advantage for the production of final products such as a napkin, a tissue paper, a feminine hygiene product, a medical pad, a placemat, a protective cover-sheet material, a liquid absorbent material or a filter sheet material.

The following examples give further detail regarding the practice of this invention. These examples are provided for illustrative purposes only and are not intended to limit the scope of the invention in any way.

Test Procedure.

Solutions of the adhesive components were prepared in 20 ml glass vials and mixed for 30 seconds on a vortex mixer (VWR Scientific Products: Standard Mini Vortexer). The ratios of the components are based on percent of the total solution solids. Films were formed by weighing an aliquot of each solution into an aluminum weighing dish (VWR, 50 ML, Cat. No. 25433-010) that will dry to 0.5 gm solids. The solutions were dried for 16 hours in a 105° C. forced air oven. The dishes were removed from the oven and allowed to equilibrate to atmospheric conditions for 5 minutes prior to testing. All percentages are by weight unless indicated otherwise. Solution stability was determined by observing the formation in the solution of haziness or cloudiness over a one day period.

The films were removed from the aluminum dish and visually evaluated for clarity, uniformity, and flexibility. Flexibility was determined by tactile observation of the ease with which the film could be bent without breaking.

The films were also tested for dry tack, wet tack and rewetability. The results of the tests are shown in Table 1 below.

Dry Tack—After the tester removed the oils from the "ball" of his thumb with acetone, the thumb was pressed onto the film surface with a force of ~15 psi. If the film and dish lifted from the table, the amount of time (measured in seconds) that it took for the film (and dish) to fall from the tester's thumb was recorded.

Wet Tack—A one square inch piece of Georgia-Pacific Soft Pull Towel was wetted with tap water and the excess water squeezed out. The wetted towel was pressed into the film with a force of ~15 psi. If the towel and film stuck together, such that the dish could be lifted from the table, the amount of time (measured in seconds) that it took for the film to fall from the wet towel was recorded. The longer the towel and film stuck together, the higher the score.

Rewetability—A drop of tap water was placed on the films. The films were evaluated as to whether they dissolved, swelled, or became "rubbery."

EXAMPLE 1

A creping composition in accordance with the invention was prepared by combining the following components to form a liquid solution:

| Creping Adhesive (95%): | PVOH (Celvol 540 ®) |
| Adhesive modifier (5%): | d-Limomene ® (From Florida Chemicals) |

EXAMPLE 2

This example was performed in a manner similar to that of Example 1, except that the following components were used to prepare the liquid creping composition:

| Creping Adhesive (95%): | PVOH (Celvol 540 ®) |
| Adhesive modifier (5%): | Grapefruit terpene ® (From Florida Chemicals) |

EXAMPLE 3

This example was performed in a manner similar to that of Example 1, except that the following components were used to prepare the liquid creping composition:

| Creping Adhesive (94%): | PVOH (Celvol 540 ®) |
| Adhesive modifier (5%): | d-Limomene ® |
| Other additives (1%): | Ammonium zirconium carbonate ("Azcote 5800M ®) |

EXAMPLE 4

This example was performed in a manner similar to that of Example 1, except that the following components were used to prepare the liquid creping composition:

| Creping Adhesive (95%): | PAE Nalco 690HA ® |
| Adhesive modifier (5%): | d-Limomene ® (Florida chemicals) |

EXAMPLE 5

This example was performed in a manner similar to that of Example 1, except that the following components were used to prepare the liquid creping composition:

| Creping Adhesive (95%): | PAE (Unisoft 805 ® from Hercules) |
| Creping adhesive modifier (5%): | d-Limomene ® (Florida chemicals) |

EXAMPLE 6

This example was performed in a manner similar to that of Example 1, except that the following components were used to prepare the liquid creping composition:

| Creping Adhesive (90%): | PVOH (Celvol 523 ®) |
| Adhesive modifier (5%): | d-Limomene ® (Florida chemicals) |
| Other additives (5%): | Zirconium ammonium carbonate (Azcote 5800M ®) |

TABLE 1

| Example | Solution Stability | Film Flexibility | Dry Tack | Wet Tack | Rewetability |
| --- | --- | --- | --- | --- | --- |
| 1 | Cloudy | Slightly Flexible | 5 | 5 | Swelled/Dissolved |
| 2 | Cloudy | Slightly Brittle | 5 | 5 | Swelled |
| 3 | Hazy | Brittle | 3 | 3 | Swelled |
| 4 | Hazy | Slightly Flexible | 2 | 5 | Swelled |
| 5 | Hazy | Brittle | 2 | 3 | Rapid swell |
| 6 | Cloudy | Slightly Flexible | 0 | 5 | Slight Swelling |

COMPARATIVE EXAMPLE 1

This comparative example was performed in a manner similar to that of Example 1, except that the following components were used to prepare the liquid creping composition outside of the scope of the invention:

| | |
|---|---|
| Creping Adhesive (100%): | PVOH (Airvol 523 ®, Celanese Corp., Dallas, Texas) |
| Creping Adhesive Modifier: | None |

COMPARATIVE EXAMPLE 2

This comparative example was performed in a manner similar to that of Example 1, except that the following components were used to prepare the liquid creping composition outside of the scope of the invention:

| | |
|---|---|
| Creping Adhesive (95%): | 65% PVOH (Celvol 523 ®) 35% PAE (Nalco 690 HA ®) |
| Creping Adhesive modifier (5%): | Cationic amine (TQ 2008 ®, Hercules, Inc., Wilmington, DE) |

COMPARATIVE EXAMPLE 3

This comparative example was performed in a manner similar to that of Example 1, except that the following components were used to prepare the liquid creping composition outside of the scope of the invention:

| | |
|---|---|
| Creping Adhesive (90%): | PAE (Solvox 4480 ®, Solvox Co., Milwaukee, WI) |
| Creping Adhesive modifier (10%): | Mineral Oil based product (Solvox 5302, Solvox Co.) |

COMPARATIVE EXAMPLE 4

This comparative example was performed in a manner similar to that of Example 1, except that the following components were used to prepare the liquid creping composition outside of the scope of the invention:

| | |
|---|---|
| Creping Adhesive (93%): | PVOH (Celvol 523 ®) |
| Creping Adhesive modifier (7%): | Potassium polyphosphate salt (Kalipol 18 ®, Albright & Wilson, West Midland, UK) |

COMPARATIVE EXAMPLE 5

This comparative example was performed in a manner similar to that of Example 1, except that the following components were used to prepare the liquid creping composition outside of the scope of the invention:

| | |
|---|---|
| Creping Adhesive (100%): | PAE (Hercules 82-176, Hercules Co. Wilmington, DE) |
| Creping Adhesive modifier: | None |

The test results of the comparative examples are set forth in Table 2 below.

TABLE 2

| Comp. Example | Solution Stability | Film Flexibility | Dry Tack | Wet Tack | Rewetability |
|---|---|---|---|---|---|
| 1 | Clear | Flexible | 2 | 5 | Slightly dissolves |
| 2 | Cloudy | Slightly yellow, brittle | 2 | 3 | Flexible/ dissolving |
| 3 | Oil separated | Brown, brittle | 2 | 1 | Slight swelling |
| 4 | Clear | Clear, flexible | 1 | 5 | Slight swelling |
| 5 | Clear | Brittle | 0 | 3 | Swelled |

As can be seen from the above results, use of terpenes achieved very high dry and wet tack and rewetability. On the other hand, Comparative Example 3, with oil separated from the PAE creping adhesive, had low dry and wet tack and was not readily rewettable. Comparative Examples 4 with the polyphosphate salt and Comparative Examples 5 with the PAE adhesive alone did not result in good rewettability. The cationic quaternary amine of Comparative Example 2 produced a brittle film with moderate dry and wet tack.

A number of patent references are cited in the foregoing specification in order to more fully describe the state of the art to which this invention pertains. The entire disclosure of each of these citations is incorporated by reference herein.

While certain embodiments of this invention have been described and/or specifically exemplified above, various other embodiments will be apparent to those skilled in the art from the foregoing disclosure. For example, the present invention may be applied in various paper-making processes, including conventional wet pressing techniques, with wet or dry creping and embossing or TAD, with creping, as previously noted. The present invention is, therefore, not limited to the embodiments described and/or exemplified herein, but is capable of considerable variation and modification without departing from the scope of the following claims.

What is claimed is:
1. A modified creping adhesive composition which is in liquid form and which comprises an adhesive component and at least one modifier component, said modifier component comprising limonene.

2. The modified creping adhesive composition of claim 1, wherein said at least one modifier component comprises d-limonene.

3. The modified creping adhesive composition of claim 1, wherein said adhesive component comprises at least one synthetic, natural or synthetically modified natural water soluble polymer, oligomer or copolymer, selected from the group consisting of polyamidoamine-epichiorohydrin resins, said polyamidoamine-epichlorohydrin resin optionally bearing polyol side chains, polyamide-epichiorohydrin resins, said polyamide-epichlorohydrin resins being optionally hydrophobically modified, poly (diallyamine)-epichlorohydrin resins, polyalkylene polyamine-epichlorohydrin resins, the reaction product of an epihalohydrin and an end-capped polyaminamide polymer, polyalkanolamides, the reaction product of (a) a mixture of polyamide and at least one of polyvinyl alcohol and low molecular weight polyethyleneimine and (b) epihalohydrin, poly(vinyl alcohol), poly(vinyl alcohol) copolymers, polyacrylamide which may be partially hydrolyzed, polymethacrylamide which may be partially hydrolyzed, poly(acrylic acid), poly(methacrylic acid), poly(hydroxyethyl acrylate), poly(hydroxyethyl methacrylate), poly(N-vinyl pyrrolidinone), polyvinylamine, polyethyleneimine, poly(ethylene oxide), poly (ethylene glycol), ethylene-vinyl acetate copolymer, hydroxyethyl cellulose, hydroxypropyl cellulose, guar gum, starch, agar, alginic acid, chitosan, carboxymethyl cellulose, highly branched polyamidoamines, and silyl-linked polymers.

4. The modified creping adhesive composition of claim 1, wherein said adhesive component comprises at least one synthetic, natural or synthetically modified natural water soluble polymer, oligimer or copolymer selected from the group consisting of polyamidoamine-epichlorohydrin resins, polyamide-epichlorohydrin resins, poly(diallylamine-epichlorohydrin resins), polyalkylene polyamine-epichlorohydrin resins, poly(vinyl alcohol), highly branched polyamidoamines, silyl-linked polyamidoamines, polyacrylamide, poly(ethylene oxide), poly (ethylene glycol), hydroxethyl cellulose, hydroxypropyl cellulose, carboxymethyl cellulose and guar gum.

5. The modified creping adhesive composition of claim 1, wherein said adhesive component comprises a non-self-crosslinkable polymer or oligomer, having functional groups that can be crosslinked by forming hydrolyzable ionic crosslinks, and a metallic crosslinking agent for said polymer or oligomer.

6. The modified creping adhesive composition of claim 1, wherein said adhesive component is selected from the group consisting of a poly(vinyl alcohol), partially hydrolyzed polyacrylamide, partially hydrolyzed methacrylamide, poly(acrylic acid), poly(methacrylic acid), alginic acid and carboxymethylcellulose.

7. The modified creping adhesive composition of claim 6, wherein said crosslinking agent is a zirconium-containing salt.

8. The modified creping adhesive composition of claim 7, wherein said crosslinking agent is selected from the group consisting of ammonium zirconium carbonate and potassium zirconium carbonate.

9. The modified creping adhesive composition of claim 1, wherein said adhesive component comprises at least one synthetic, natural or synthetically modified natural water soluble polymer, oligomer or copolymer selected from the group consisting of polyamidoamine-epichlorohydrin resins, polyamide-epichlorohydrin resins, poly(vinyl alcohol), highly branched polyamidoamines, and silyl-linked polyamidoamines.

10. The modified creping adhesive composition of claim 3, wherein said at least one modifier component comprises d-limonene.

11. The modified creping adhesive composition of claim 10, wherein said d-limonene is present in an amount from about 1- to about 10-weight percent, based on the total solids content of the composition.

12. The modified creping adhesive composition of claim 1 comprising an additional modifier selected from the group consisting of ammonium zirconium carbonate, potassium zirconium carbonate or a phosphate salt.

13. The modified creping adhesive composition of claim 1, further comprising at least one paper-making additive.

14. The modified creping adhesive composition of claim 13, wherein said additive is selected from the group consisting of a release agent, a tackifier, a surfactant, a dispersant, a salt which is effective to adjust water hardness, an acid or a base.

15. A modified creping adhesive composition comprising about 90 to about 99 weight percent of a poly(vinyl alcohol) resin and about 1 to about 5 weight percent d-limonene and, optionally, up to about 5 weight percent of ammonium zirconium carbonate, all of said percentages being based on the total solids content of the composition.

16. An improved method of making crepe paper products by pressing a web of paper-making fibers against the surface of a rotating cylindrical dryer and separating said web from said surface by a creping blade, the improvement which comprises applying to the surface of said rotating cylindrical dryer or to said web a modified creping adhesive composition as claimed in claim 1.

17. The method of claim 16, wherein the modified creping adhesive composition applied to said rotating cylindrical dryer comprises at least one synthetic natural or synthetically modified natural water soluble polymer or copolymer, selected from the group consisting of polyamidoamine-epichlorohydrin resins, said polyamidoamine-epichlorohydrin resin optionally bearing polyol side chains, polyamine-epichlorohydrin resins, said polyamide-epichlorohydrin resins being optionally hydrophobically modified, poly (diallyamine)-epichlorohydrin resins, polyalkylene polyamine-epichlorohydrin resins, the reaction product of an epihalohydrin and an end-capped polyaminamide polymer, water-soluble polyalhanolamides, the reaction product of (a) a mixture of polyamide and at least one of polyvinyl alcohol and low molecular weight polyethyleneimine and (b) epihalohydrin, poly(vinyl alcohol), poly(vinyl alcohol) copolymers, polyacrylamide which may be partially hydrolyzed, polymethacrylamide which may be partially hydrolyzed, poly(acrylic acid), poly(methacrylic acid), poly(hydroxyethyl acrylate), poly(hydroxyethyl methacrylate), poly(N-vinyl pyrrolidinone), polyvinylamine, polyethylene-imine, poly(ethylene oxide), poly(ethylene glycol), ethylene-vinyl acetate copolymer, hydroxyethyl cellulose, hydroxypropyl cellulose, guar gum, starch, agar, alginic acid, chitosan, carboxymethyl cellulose, highly branched polyamidoamines, and silyl-linked polymers.

18. The method of claim 17, wherein said modified creping adhesive composition is applied in an amount in the range from about 0.1 pounds per ton to about 10 pounds per ton.

19. The method of claim 18, wherein said modified creping adhesive composition is applied in an amount in the range from about 0.5 pounds per ton to about 2 pounds per ton.

20. A crepe paper product produced by the method of claim 16.

21. The crepe paper product of claim 20, in a form selected from the group consisting of a napkin, a tissue paper, a feminine hygiene product, a medical pad, a placemat, a protective cover-sheet material, a liquid absorbent sheet material or a filter sheet material.

22. A web of paper-making fibers having on the surface thereof a modified creping adhesive composition as claimed in claim 1.

23. A drying surface for a fibrous web including on said surface a modified creping adhesive composition as claimed in claim 1.

* * * * *